United States Patent [19]

Case

[11] 3,925,884

[45] Dec. 16, 1975

[54] METHOD OF MANUFACTURING MULTI-TRACK MAGNETIC HEADS

[76] Inventor: Derek Frank Case, 122 Cadbury Rd., Sunbury-on-Thames, England

[22] Filed: Dec. 7, 1973

[21] Appl. No.: 422,686

[30] Foreign Application Priority Data

Dec. 29, 1972 United Kingdom............... 60100/72

[52] U.S. Cl. .................. 29/603; 360/103; 360/123; 360/127

[51] Int. Cl. .............................................. H01f 7/06

[58] Field of Search ...... 29/603; 360/122, 123, 125, 360/127, 103

[56] References Cited

UNITED STATES PATENTS

| | | | |
|---|---|---|---|
| 3,601,871 | 8/1971 | Pierce | 29/603 |
| 3,613,228 | 10/1971 | Cook et al. | 29/603 |
| 3,737,992 | 6/1973 | Braun et al. | 29/603 |

*Primary Examiner*—Carl E. Hall
*Attorney, Agent, or Firm*—George R. Douglas, Jr.

[57] ABSTRACT

Multi-track magnetic heads are batch fabricated from strips of ferrite, each having a plurality of windows through which coils are wound. The strips are bonded together with the windows in alignment, and are then divided along planes transverse to the length of the strips. This results in a batch of substantially identical multi-track heads, each with its own coil.

6 Claims, 9 Drawing Figures

METHOD OF MANUFACTURING MULTI-TRACK MAGNETIC HEADS

BACKGROUND OF THE INVENTION

This invention relates to multi-track magnetic heads.

It is well known to provide a magnetic head comprising a member of magnetic material (e.g. a ferrite) having a window formed in it, with a coil wound around the member and passing through the window so as to be electromagnetically coupled to the magnetic material. Typically, the magnetic member is generally C-shaped and the head also includes a further, generally I-shaped magnetic member positioned adjacent the C-member so as to accurately define a non-magnetic gap which constitutes the transducing gap of the head. Multi-track magnetic heads, comprising a plurality of individual heads positioned side-by-side on a support, are also known.

The manufacture of multi-track magnetic heads presents considerable difficulties, since the heads are usually required to be of very small size and to be produced to a high degree of precision. It is clearly desirable to manufacture such heads by a batch-fabrication method providing a batch of substantially identical heads, thereby ensuring substantial uniformity in the characteristics of the heads. However, known methods of manufacturing multi-track heads do not always lend themselves readily to batch fabrication.

SUMMARY OF THE INVENTION

One object of the present invention is to provide a novel batch-fabrication method of manufacturing multi-track heads.

According to the invention, a method of manufacturing multi-track magnetic heads comprises the steps of: forming a plurality of elongated strips of magnetic material; forming in each said strip a plurality of windows, spaced apart along the length of the strip; winding around each said strip a plurality of coils passing through respective ones of said windows; bonding the strips, with the coils wound on them, together in spaced parallel relationship with corresponding ones of said windows aligned in a direction transverse to the length of said strips; and dividing the strips along spaced parallel planes extending in said transverse direction, thereby to produce a plurality of substantially identical multi-track magnetic heads each containing a portion of each said strip, each said portion having one of said coils electromagnetically coupled to it.

BRIEF DESCRIPTION OF DRAWINGS

A method in accordance with the invention will now be described by way of example with reference to the accompanying drawings in which.

DESCRIPTION OF PREFERRED EMBODIMENT

Figures 1, 2, 3:
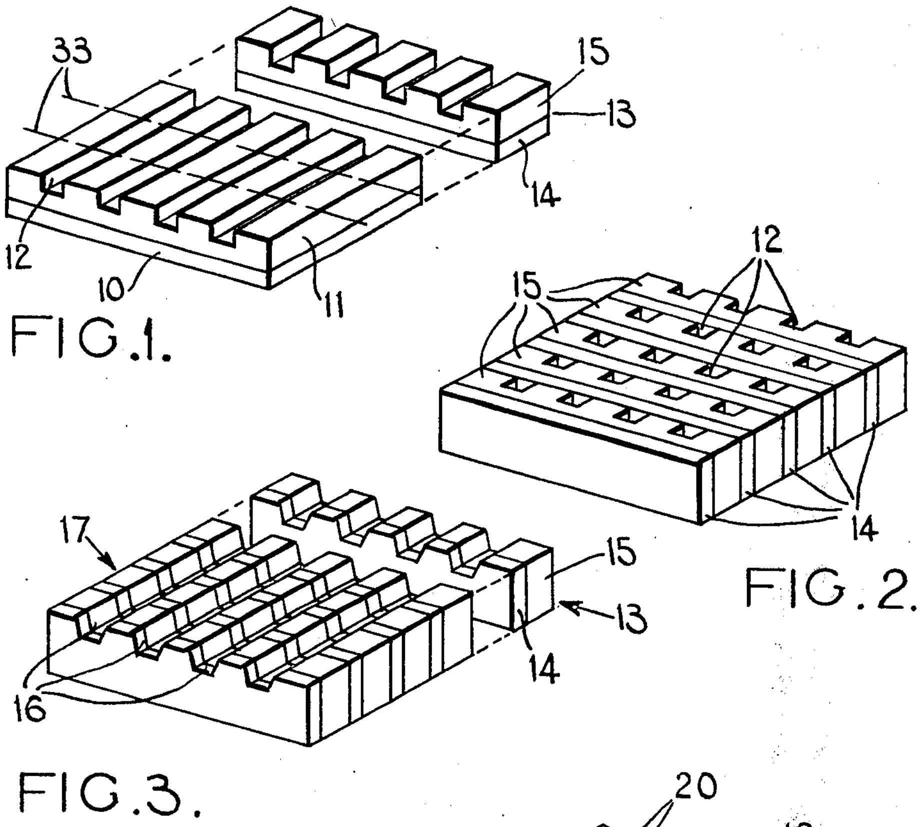
FIGS. 1 – 6 shows steps in the production of an assembly of C-shaped cores with windings.

A plurality of C cores each with a winding coupled thereto and arranged in a matrix formation are produced as follows. Referring to FIG. 1, a plate of ferrite 10 is bonded to a plate of non-magnetic material such as glass, or glass ceramic, 11. The ferrite plate 10 is lapped to a thickness equal to the required width of magnetic head core and the glass plate 11 is lapped to a thickness equal to the desired spacing between adjacent tracks of the finished multi track head. In practice the plate 11 is slightly thinner than the intertrack spacing to allow for the thickness of bonding layers. A number of winding slots 12 are cut into the thickness of the glass plate 11, the slots being in spaced parallel relationship. The bonded plates 10, 11 are divided along spaced parallel planes 33 to yield a plurality of elongate elements 13 each consisting of a ferrite strip 14 and a glass spacer strip 15. The elongate elements 13 are turned through 90° and temporarily mounted side by side, as shown in FIG. 2, on a support (not shown) in a sandwich formation of ferrite strips 14 spaced apart in parallel plates by spacer strips 15. The temporary assembly of elements 13 is form ground to produce channels 16 in the front faces 17 (i.e. the top face as viewed in FIG. 3) of the elements 13, FIG. 3, extending transversely of the elements 13. The channels 16 are aligned with the winding slots 12 in the spacers 15 so as to provide winding windows in the ferrite strips 14 which connect with the winding slots 12.

Figure 4:
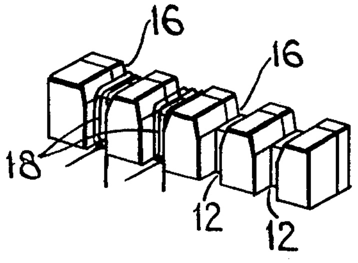
Figure 5:
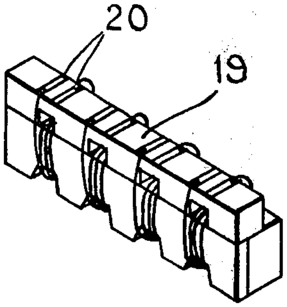

The elements 13 are removed from the temporary support and a plurality of coils 18 (FIG. 4) are wound on each element 13, the coils extending around the ferrite strips 14 and spacers 15 and passing through the winding windows 16 and winding slots 12. After winding the coils 18 a termination strip 19 is secured by adhesive to the rear face of each element 13, (FIG. 5). The termination strips 19 each consist of a strip of electrically insulating material which is slotted on one face to accommodate the coils 18 and on the opposite face carries pairs of conductor strips 20. The pairs of ends of the coils 18 are terminated on the pairs of conductor strips 20. The termination strips 19 may be produced by cutting strips from a sheet of insulating material which carries on one face pairs of parallel conductor strips and has parallel slots in the other face.

The wound elements 13, with the termination strips 19 secured thereto, are bonded together (FIG. 6) in the same side by side relationship as that in which they were temporarily mounted and the front face 17 of the bonded assembly (i.e. the bottom face as viewed in FIG. 6) is lapped to provide optically flat co-planar surfaces for mating with a corresponding assembly of I cores.

Figures 6, 7, 8:
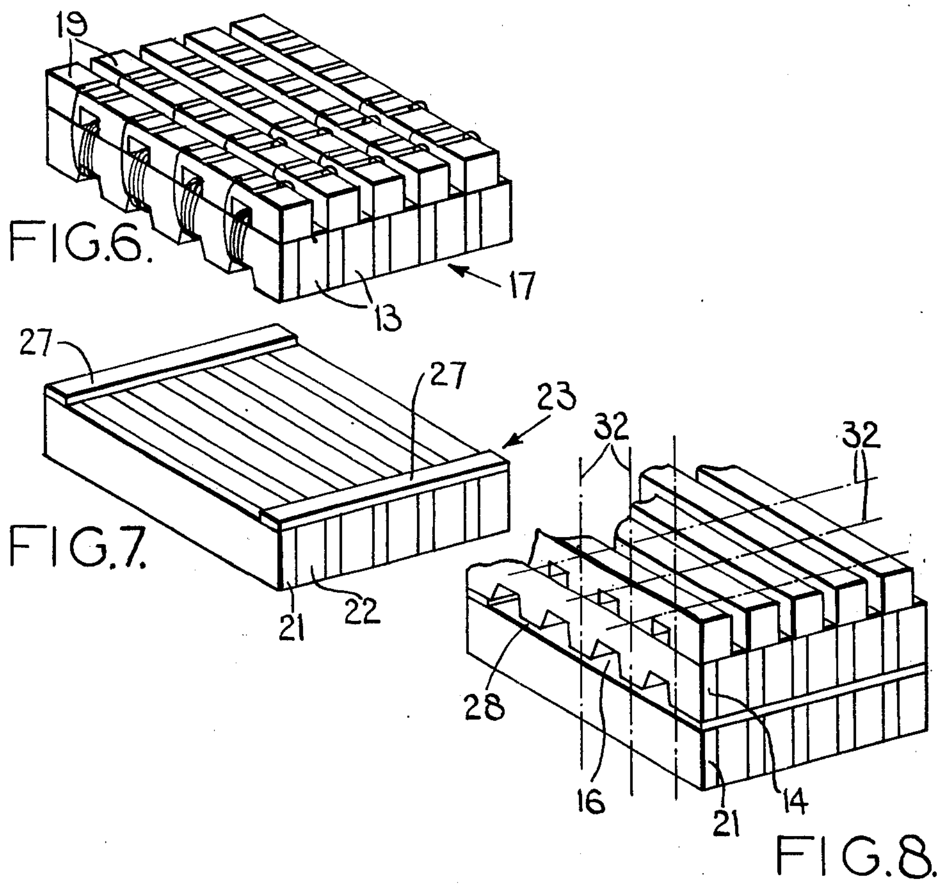
FIG. 7 shows an assembly of I shaped cores.
FIG. 8 shows the C core and I core assemblies.

The assembly of I cores is manufactured in a similar manner to the assembly of C cores. A ferrite plate is bonded to spacer plate of glass, or glass ceramic but this time the spacer plate does not have to be slotted. After lapping the ferrite and spacer plates to the required thicknesses, the bonded plates are divided into elongate elements each consisting of a ferrite strip 21 and a spacer strip 22. These elements are turned through 90° and bonded together as shown in FIG. 7 to produce a sandwich formation of ferrite strips 21 spaced apart by spacer strips 22. The upper face 23 (as viewed in FIG. 7) of the assembly of I cores is lapped to an optically flat surface for mating with the face 17 of the C core assembly. The combined thickness of ferrite strip 21 and spacer strip 22 is the same as the combined thickness of ferrite strip 14 and spacer strip 15 so that the centre-to-centre spacing of the ferrite strips 22 is identical with the centre-to-centre spacing of the ferrite strips 14. Generally the ferrite strips 14 and 22 will be of equal thickness so that the spacer strips 15 and 23 will also be of equal thickness. However, if desired, the strips 14 and 22 may be of different thicknesses.

Stripes 27 of gold are evaporated onto the lapped face 23 and the C and I core assemblies are bonded together (FIG. 8) by a non-magnetic material (e.g. a resin) with the edges of the magnetic strips 14 aligned with the edges of the magnetic strips 21. The gold stripes 27 maintain the faces 17, 23 of the C and I cores assemblies spaced apart by a small distance so as to provide non-magnetic gaps 28 between the C and I core ferrite strips 14, 21. Alternatively silicon monoxide may be deposited on the mating surfaces of the assemblies and the assemblies are bonded by resin in the regions of the channels 16.

Figure 9:
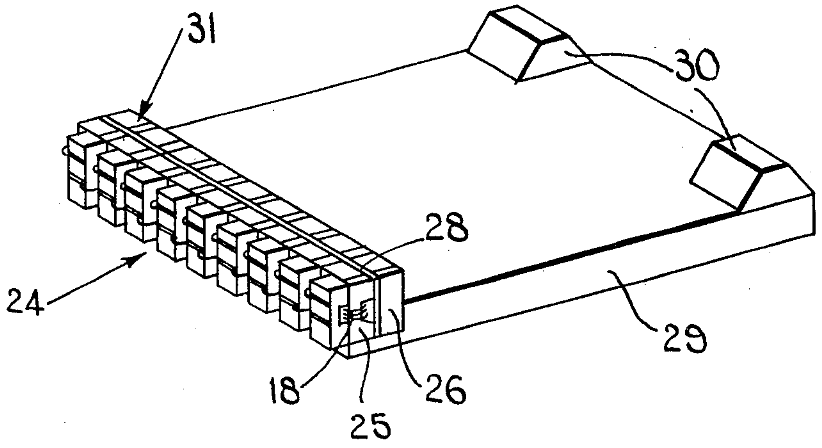
FIG. 9 shows a finished multi track head assembly.

The bonded C and I core block is divided along spaced parallel planes 32 extending parallel to and intermediate the channels 16 to produce a plurality of rows 24 (FIG. 9) of magnetic transducing heads each having a C core 25, and I core 26, a coil 18 coupled to the core and a non-magnetic transducing gap 28. The portions of the block containing the gold stripes 27 are served from the remainder of the block and are discarded.

Finally, the rows of heads 24 are bonded to substrate carriers 29 (FIG. 9) which also carries air bearing pads 30. The upper surface 31 (as viewed in FIG. 9) of the row of heads is lapped to a profile which ensures that, in operation with a magnetic record disc, the heads float on a film of air so that they are spaced from but closely adjacent the surface of the record disc. Also during profiling of the surface 31 of the heads the depths of the gaps 28 may be adjusted.

While a single embodiment of multi-track head has been described, it will be appreciated that the method of the invention may be employed to produce other forms of multi-track head. For example if read/write and erase heads are to be produced, in which one transducing gap functions for reading and writing and a second gap functions for erasing recorded information from the magnetic record disc, the I core assembly may be lapped on both faces to give opposed optically flat surfaces and the I core assembly is sandwiched between two C core assemblies with the required non-magnetic gaps between the assemblies. The bonded block is divided into rows of heads as described above.

Instead of using ferrite as the magnetic material other magnetic materials, such as mumetal, could be used.

I claim:

1. A method of manufacturing multi-track magnetic heads comprising the steps of:

providing a plate of magnetic material;

bonding a plate of non-magnetic material to said plate of magnetic material;

dividing the bonded plates into a plurality of elongate elements each element comprising a strip of magnetic material bonded to a non-magnetic strip;

turning each of said elements through 90° so that said magnetic strips are spaced from each other by said non-magnetic strips;

temporarily securing the elements in that position;

forming a plurality of parallel channels in a direction transverse to the length of said strips, each channel cutting through all said strips so as to form a window in each said magnetic strip;

separating the elements again;

winding around each said element a plurality of coils passing through respective ones of said windows;

bonding said elements, with the coils wound on them, together in spaced parallel relationship with corresponding ones of said windows aligned in a direction transverse to the length of said elements, and with said magnetic strips spaced from each other by said non-magnetic strips; and dividing said elements along spaced parallel planes extending in said transverse direction, thereby to produce a plurality of substantially identical multi-track magnetic heads each containing a portion of each said element and each having one of said coils electromagnetically coupled to it.

2. A method according to claim 1 including the further steps of bonding an electrically insulating termination strip to each said magnetic strip, each termination strip carrying a plurality of conductor strips, and electrically connecting said coils to respective ones of said conductor strips.

3. A method of manufacturing a multi-track magnetic transducing head including the steps of: forming a plurality of elongated strips of magnetic material; forming in each strip a plurality of windows spaced apart along the length of the strip by temporarily mounting the magnetic strips together in parallel relationship, then forming a plurality of parallel channels in the strips in a direction transverse to the length of the said strips and then separating the strips; winding around each strip a plurality of coils passing through respective ones of said windows; bonding the strips, with the coils wound on them, together in spaced parallel arrangement with corresponding ones of said windows aligned in a direction transverse to the length of said strips; and dividing the strips along spaced parallel planes extending in said transverse direction thereby to produce a plurality of substantially identical multi-track magnetic heads each containing a portion of each said strip, each said portion having one of said coils electromagnetically coupled to it.

4. A method as claimed in claim 3, wherein prior to the winding of said coils spacer strips are bonded to respective ones of the magnetic strips to hold the magnetic strips in spaced parallel relationship.

5. A method according to claim 4 wherein said spacer strips have slots formed in them, said slots and said windows being mutually aligned so that said coils pass through said slots as well as through said windows.

6. A method according to claim 4 wherein said step of forming said magnetic strips comprises:

bonding a plate of magnetic material to a plate of non-magnetic material; and dividing the bonded plates into a plurality of elongate elements each element comprising a said strip of magnetic material bonded to a said non-magnetic spacer strip.

* * * * *